United States Patent [19]
Hosoya

[11] Patent Number: 5,713,641
[45] Date of Patent: Feb. 3, 1998

[54] BRAKE PRESSURE CONTROL DEVICE

[75] Inventor: Yukio Hosoya, Hamakita, Japan

[73] Assignee: Nisshinbo Industries, Inc., Tokyo, Japan

[21] Appl. No.: 601,610

[22] Filed: Feb. 14, 1996

[30] Foreign Application Priority Data

Jun. 5, 1995 [JP] Japan .................................. 7-161508

[51] Int. Cl.⁶ ................................................ B60T 8/38
[52] U.S. Cl. .................................. 303/117.1; 303/119.1; 303/900
[58] Field of Search ............................ 303/117.1, 119.2, 303/116.1, 116.2, 900

[56] References Cited

U.S. PATENT DOCUMENTS

| | | | |
|---|---|---|---|
| 4,915,459 | 4/1990 | Hashida | 303/117.1 |
| 5,310,253 | 5/1994 | Beck | 303/117.1 |

Primary Examiner—Lee W. Young
Assistant Examiner—C. T. Bartz
Attorney, Agent, or Firm—Nikaido, Marmelstein, Murray & Oram LLP

[57] ABSTRACT

A brake pressure control device is provided that prevents the accumulation of contaminants which will interfere with a pressure rise, and supplies adequate hydraulic pressure during sudden braking, thereby ensuring very safe braking. A piston 16 housing a valve plug 24 is housed inside a cavity 12, and a first variable restrictor 32, formed between the cavity and the piston, and a second variable restrictor 33 and a third variable restrictor 34, both formed between the piston and the valve plug are arranged in series, and a fluid path with passage to main brake line I on the wheel cylinder side is connected between the second variable restrictor and third variable restrictor.

17 Claims, 11 Drawing Sheets

BRAKE PRESSURE CONTROL DEVICE

BACKGROUND OF INVENTION

This invention relates to a brake pressure control device applicable to a vehicle that is equipped with an antilock brake system (ABS) to prevent the wheels from locking, a traction system (TCS) to prevent the drive wheels from slipping, or a like system.

Generally, this type of device is equipped with a large number of electromagnetically-actuated valves that are used as inlet valves and exhaust valves. However, in order to reduce the number of the solenoid valves, a variety of brake pressure control devices have been previously disclosed in which the inlet valves are hydraulically-actuated.

Figure 13:
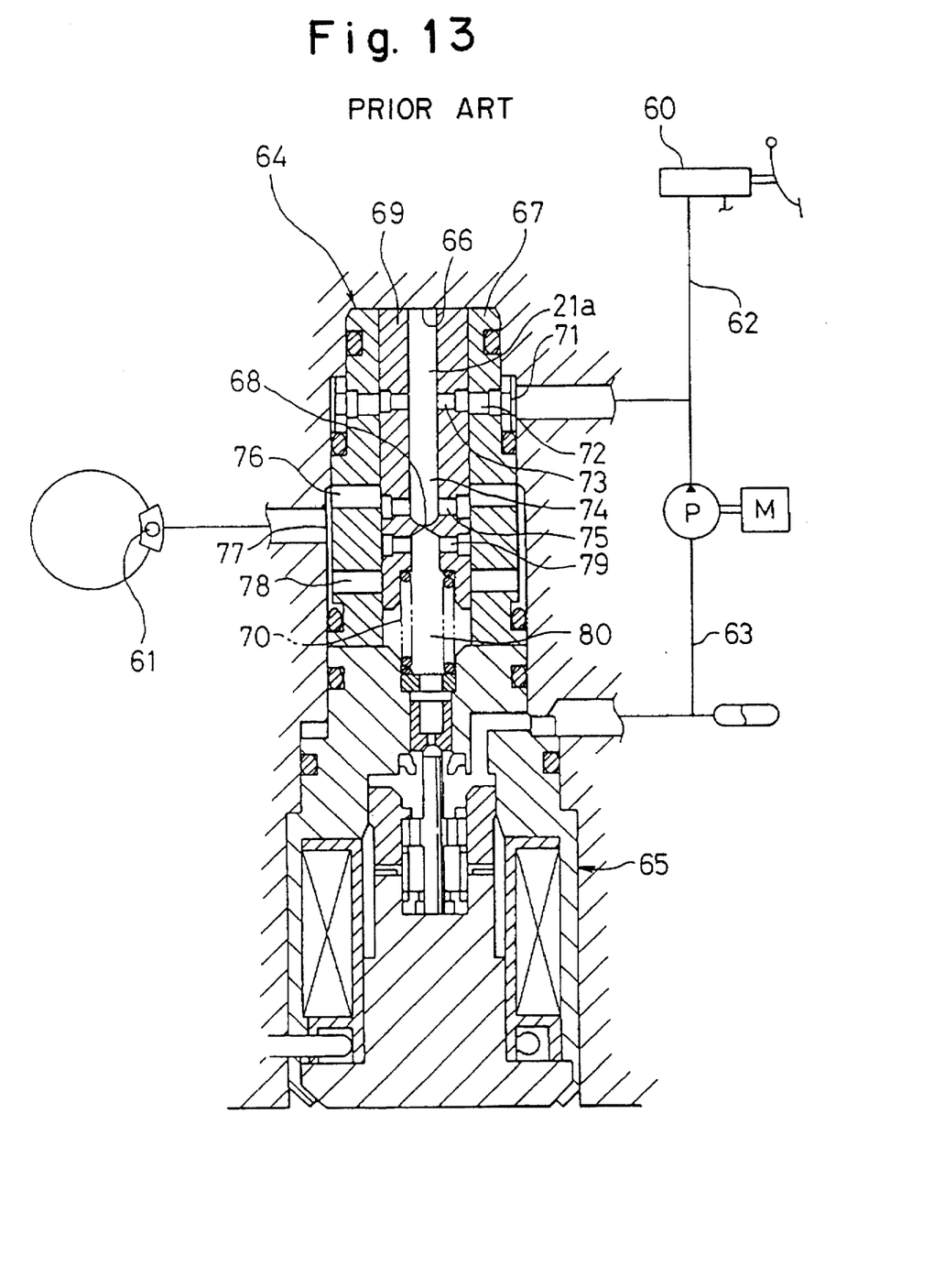
FIG. 13 is a conceptual diagram of a conventional brake pressure control device.

For example, in the device disclosed in the Publication of Unexamined Japanese Patent Application Heisei 1(1989)-306357, as shown in FIG. 13, a main brake line 62 connects the master cylinder 60 to a wheel cylinder 61, an exhaust line 63 branches from the main brake line 62 with a hydraulically-actuated flow control valve 64 set at the point of the branching, and a conventional electromagnetically-actuated exhaust valve 65 is set in the exhaust line 63.

The flow control valve 64 is composed of an inner cylinder 67 housed inside a cavity 66, a spool 69 housed to slide inside the inner cylinder 67 and forming a fixed-diameter orifice 68 therein, and return springs 70 which force the spool 69 towards the closed end of the cavity 66. A number of fluid passages are bored through both the inner cylinder 67 and spool 69 in the radial direction.

The brake pressure control device as described has the following problems:

1. When ABS action causes the pressure to rise, the spool 69 drops, thereby blocking the large fluid path, wherein the brake fluid is bypassed through the fixed-diameter orifice 68, a small cross section, and supplied to the wheel cylinder 61. The cross section diameter of the fixed-diameter orifice 68 is extremely small, and is of the order of between 0.2 mm–0.3 mm, in which case contaminants can readily accumulate and are removable only by dismantling and cleaning the device. A buildup of contaminants would block the fluid flow. As a result, in the braking force will be inadequate.
2. A large brake fluid path is formed from an inlet port 71, fluid channels 72–76, and outlet port 77. However, during sudden braking when the spool 69 moves towards the return spring chamber 80, this large fluid path becomes constricted or blocked, creating the risk of insufficient braking force.

That is during sudden braking when a strong fluid force acts on spool 69, it is pushed towards the return spring chamber 80. As a result, the brake fluid inside the return spring chamber 80 will be compressed and forced around the exterior of the spool 69 and out through the fluid channel 78 which has a passage to the wheel cylinder 61. This allows the spool 69 to drop (that is, move towards the return spring chamber 80), constricting or blocking fluid passage between the fluid channel 75 and fluid channel 76, resulting in an insufficient braking force.

A number of fluid channels, 72, 73, 75, 76, 78, 79 must be bored in the radial direction through the inner cylinder 67 and spool 69. This fabrication increases the cost of the device.

SUMMARY AND OBJECTIVES OF THIS INVENTION

The present invention was designed with the above noted problems in mind. The objects of the present invention are as follows:

1. To provide a brake pressure control device that prevents the accumulation of contaminants, thereby ensuring that the pressure can rise again during ABS or TCS action, thus ensuring a high degree of safety.
2. To provide a brake pressure control device that will provide sufficient braking pressure during sudden braking, thereby assuring a high degree of safety.
3. To provide a small, inexpensive brake pressure control device that requires a fewer number of fluid channels.

In view of these objectives, a brake pressure control device is provided that prevents the accumulation of contaminants which will interfere with a pressure rise, and supplies adequate hydraulic pressure during sudden braking, thereby ensuring very safe braking. A piston 16 housing a valve plug 24 is housed inside a cavity 12, and a first variable restrictor 32, formed between the cavity and the piston, and a second variable restrictor 33 and third variable restrictor 34, both formed between the piston and the valve plug are arranged in series, and a fluid path with passage to main brake line I on the wheel cylinder side is connected between the second variable restrictor and third variable restrictor.

In the brake pressure control device, all restrictors to regulate the flow of brake fluid are variable restrictors, and should contaminants become lodged inside any restrictor, the variable movement of the restrictor will forcibly remove the contaminants to prevent clogging of the fluid channel.

Moreover, the piston will not drop even when subjected to high pressure during sudden braking, thereby maintaining a large fluid path between the inlet and the outlet to ensure adequate braking pressure.

This invention offers the following advantages.

1. All restrictors used to vary the flow of brake fluid are variable restrictors in which the cross section diameter of the fluid path changes, and no orifices of fixed diameter are used. This variable constriction provides a self-cleaning action to prevent clogging of the fluid lines with contaminants and provides safer braking action.
2. A line to bypass the passage between the inlet port and outlet port and connecting the pressure reduction chamber and a wheel brake is not required. This prevents brake fluid from being discharged from the pressure reduction chamber during sudden braking when the large pressure generated therein would act to push the piston towards the pressure reduction chamber. The piston therefor does not move, maintaining a large fluid path between the inlet port and outlet port to assure sufficient braking pressure, again providing more safety.
3. Only two fluid passages need to be machined in the radial direction of the piston and cavity, reducing the number of fabrication steps.
4. Only two radial fluid passages are required in the cavity; moreover the relative position of the two passages need not be manufactured with a high degree of precision. Thus, the piston can be housed directly in the cavity of the housing, without the use of a guide tube. This makes for a smaller and lower-cost device.

SIMPLIFIED EXPLANATION OF DRAWINGS

The above and other objects and the attendant advantages of the present invention will become readily apparent by reference to the following detailed description when considered in conjunction with the accompanying drawings wherein.

DETAILED DESCRIPTION OF THE INVENTION AND OF THE PREFERRED EMBODIMENT

A working example of this invention is explained next with reference to the diagrams.

A. Overall Configuration

Figure 1:
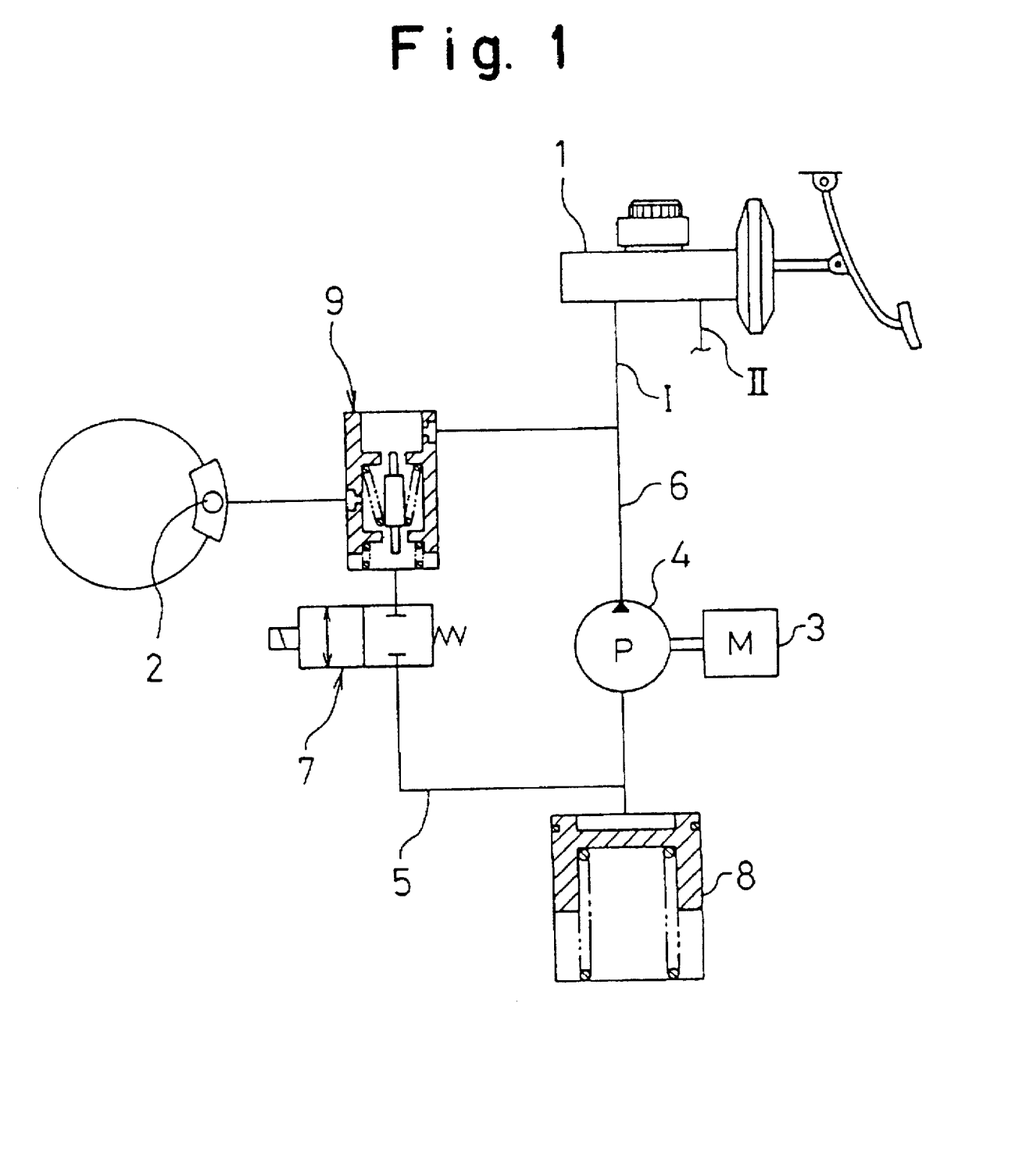
FIG. 1 illustrates a braking system configured with the brake pressure control device equipped with an ABS function as embodied in Example 1.

FIG. 1 is a conceptual diagram of a brake pressure control device equipped with an ABS function.

The master cylinder 1, the pressure-generating source, and the wheel cylinders 2, the wheel brakes, are connected by two main brake lines, I, II. The connections between the master cylinder and the rear-left, rear-right, front-left, and front-right wheels, not shown, can be split into two diagonal brake circuits, or into a front brake circuit and a rear brake circuit, in a conventionally known manner.

An exhaust line 5 is connected to the main brake line I from the master cylinder side to the suction side of the hydraulic pump 4 (auxiliary hydraulic pressure source), which is interlocked with and driven by motor 3; and a delivery line 6 is connected from the discharge side of the hydraulic pump to the main brake line I. A normally-closed, electromagnetically-actuated exhaust valve 7 and an auxiliary reservoir 8 are set in the exhaust line 5; and a normally-open, hydraulically-actuated flow control valve 9 is set at the point of branching of the exhaust line 5 from the main brake line I. Each wheel is equipped with a speed sensor of a conventionally known type, omitted from the diagram, that detects the speed of the wheel; and each sensor is connected to a conventional electronic module, again not shown in the diagram. The electronic module transmits electrical control signals to the motor 3 and exhaust valve 7 if a potential skid is detected in any wheel.

B. Flow Control Valve

Figure 2:
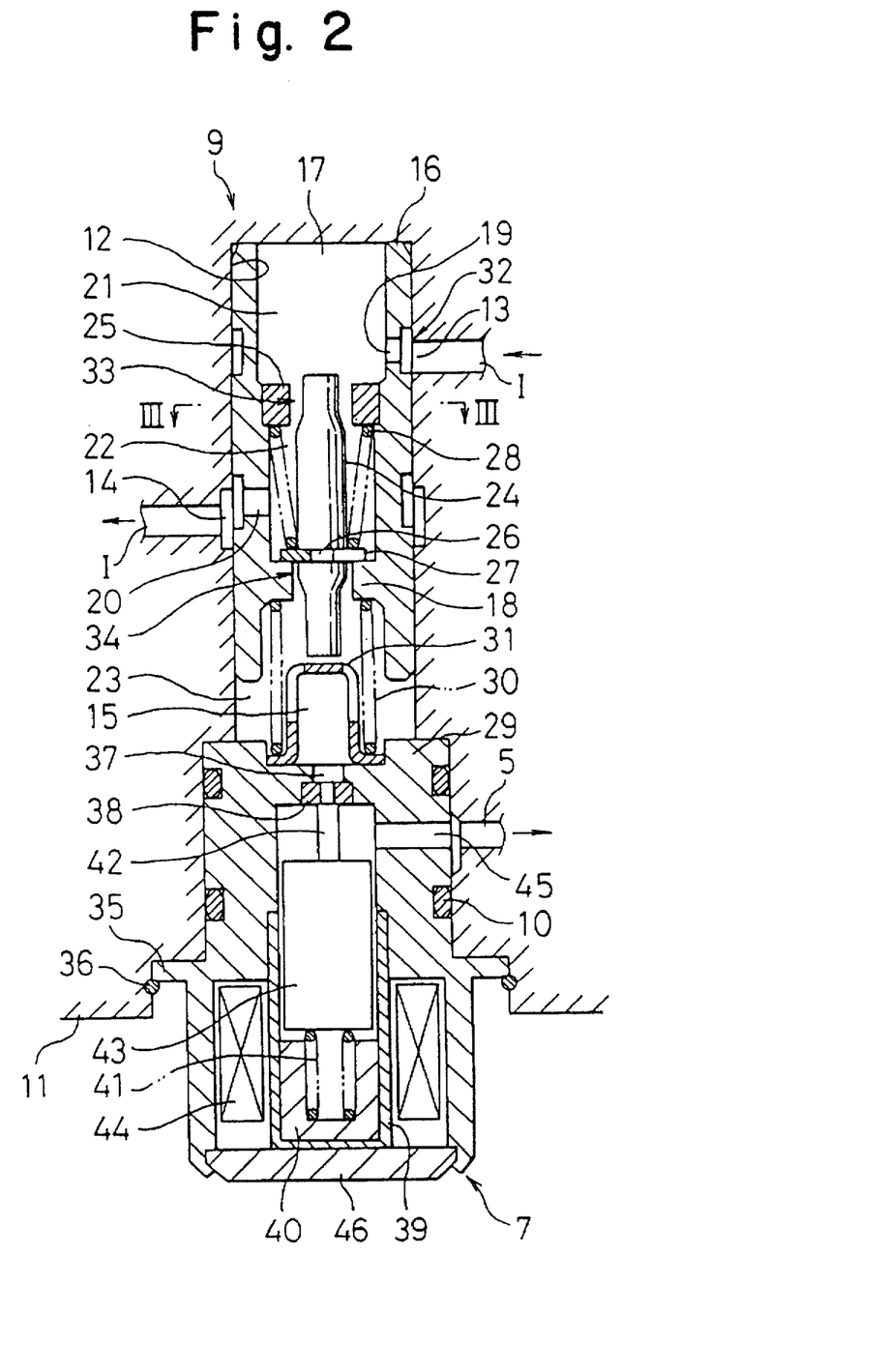
FIG. 2 is a cross section diagram of the exhaust valve and flow control valve assembled into one integral unit.
Figure 3A:
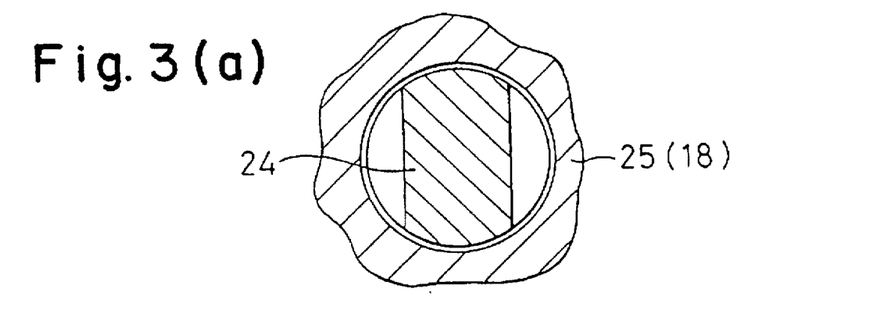
FIG. 3 is a cross section diagram of that portion of the integrated valve unit of FIG. 2 between the symbols III—III, and explains the shapes of the fluid channels that can be formed in the valve plug.
Figure 3B:
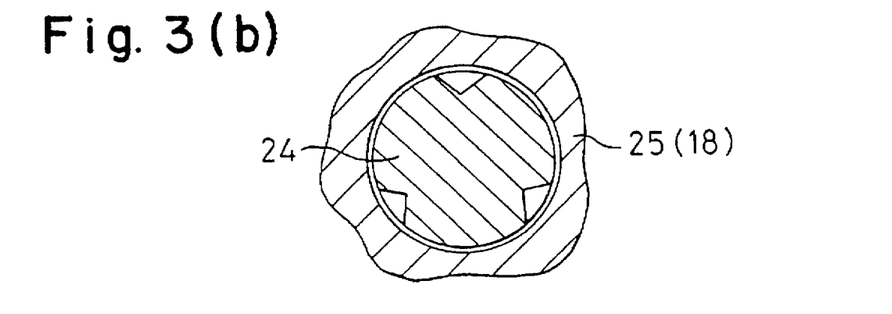
Figure 3C:
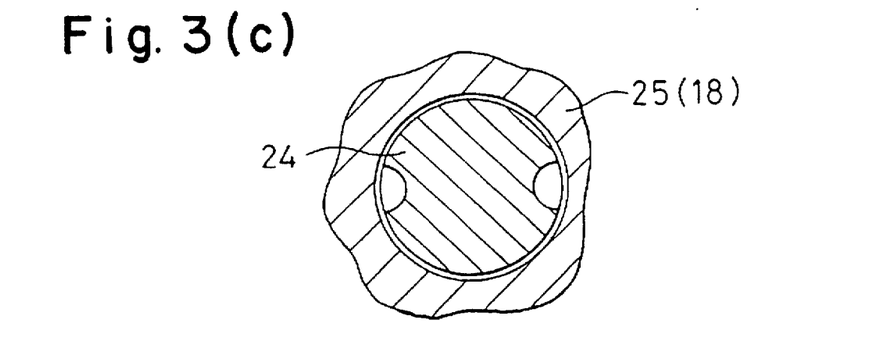
Figure 3D:
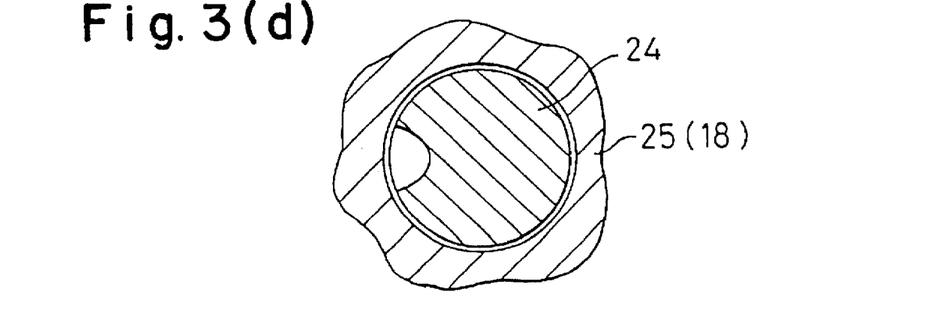

FIG. 2 is a cross section diagram of the exhaust valve 7 and flow control valve 9 assembled into an integrated body, which is in a non-operating state.

Housing 11 is configured from one or more cavities 12 of variable diameter that houses the exhaust valve 7 and flow control valve 9 in series. An inlet port 13 and outlet port 14 are formed in the closed end of the cavity 12; wherein the inlet port has passage to the master cylinder side of the main brake line I, and the outlet port has passage to the wheel cylinder side of the main brake line. An exhaust port 15 is formed on the opening side of the cavity 12, and has passage to the exhaust line 5 via the exhaust valve 7.

A cylindrical piston 16 with a through-hole 17 is housed to slide within cavity 12. Inside the through-hole 17, a tubular projection 18 is formed integrally as part of piston 16 and a bushing 25, a ring-shaped projection affixed to the through-hole 17, are separated at a prescribed distance. A first fluid passage 19 and a second fluid passage 20 are formed in the radial direction on either side of the bushing 25.

Within the space enclosed by cavity 12, piston 16, and exhaust valve 7, an inlet chamber 21, outlet chamber 22, and pressure reduction chamber 23 are formed in the closed end of the cavity. First fluid passage 19 enables passage between inlet port 13 and inlet chamber 21; and second fluid passage 20 enables passage between outlet port 14 and outlet chamber 22.

The valve plug 24 is a columnar unit of virtually the same diameter as the inner diameter of the tubular projection 18. A thin layer of the upper and lower portions of the valve plug 24 is trimmed off to form a fluid channel as the plug is guided along the tubular projection 18 (see FIG. 3(a)). As shown in FIG. 3 (b)–(d), one or more cross section V-shaped or arc-shaped grooves can be formed on the outer surface of the valve plug 24 to form fluid channels. The structure of the fluid channels between the valve plug 24 and the bushing 25 is the same as the structure of the fluid channels between the upper portion of the valve plug 24 and the tubular projection 18. In other words, the lower portion of the valve plug 24 is trimmed off to form a fluid channel as the plug is guided along the bushing 25. However, the fluid channels are not restricted to a structure as shown in the diagram, and any structure may be applicable.

A C-shaped retaining ring 27, mounted in the peripheral groove 26 of valve plug 24, abuts against the upper face of the tubular projection 18, to fix the position to which the valve plug 24 drops relative to the piston 16. Normally, a small fluid channel is formed to maintain passage between the outlet chamber 22 and pressure reduction chamber 23.

Springs 28 are compressed between the bottom face of the bushing 25 and the upper face of the retaining ring 27. The restoring force of the springs 28 push the valve plug 24 towards the cavity opening, i.e. the pressure reduction chamber 23.

In addition, the exhaust valve 7 seals the cavity 12, and return springs 30 are compressed between the valve body 29 of the exhaust valve 7 and the tubular projection 18. The restoring forces of the return springs 30 push the piston 16 towards the closed end of the cavity, i.e. the inlet chamber 21. The spring forces of the return springs 30 are set to be greater than that of the springs 28 described previously.

A sleeve 31, a slit on the top face of valve body 29, limits the position to which the valve plug 24 drops relative to the cavity 12. The sleeve 31 is not required if that portion of the bottom of the valve plug 24 extending below the tubular projection 18 is made equal to the height of the sleeve 31. If used, the bottom of the return springs 30 can be set to push against the cuff of the sleeve 31. This will enable the sleeve 31 to be mounted onto the valve body 29 without welding or screwing.

The housing 11 and piston 16 should preferably be made from materials which have the same thermal coefficient of expansion. Otherwise, temperature variations will cause the clearance between the inner surface of the cavity 12 and the outer surface of the piston 16 to fluctuate, in which case, the airtight seal between the two components could be lost or the piston 16 could be immobilized. An aluminum alloy is a preferred material for both the housing 11 and piston 16, but other materials can be used.

As well, the tubular projection 18 of the variable restrictor 33 and the valve plug 24 should preferably be made of materials having the same thermal coefficient of expansion. The degree of constriction of the second variable restrictor 33 is the main determinant factor of the flow characteristics of the flow control valve 9. Hence, using materials having the same thermal coefficient of expansion will minimize the fluctuations with temperature changes in the cross-sectional area of the fluid path in the constricted state. Steel is a preferred material for both the bushing 25 and valve plug 24, but other materials can be used.

C. Variable Restrictors

As shown in FIG. 2, first variable restrictor 32, second variable restrictor 33, and third variable restrictor 34 are formed between the cavity 12, piston 16, and valve plug 24.

The first variable restrictor 32 is formed between the inlet port 13 and the ringed groove of first fluid passage 19 of piston 16, and the cross-sectional area of the fluid passage changes as the piston 16 moves relative to the cavity 12. The second variable restrictor 33, formed between the bushing 25 and the upper portion of valve plug 24, normally allows a large flow, but during control action, the area of the fluid passage changes and piston 16 and valve plug 24 move relative to each other. The third variable restrictor 34, formed between the tubular projection 18 and the lower portion of the valve plug 24, normally forms a passage of small cross-sectional area, but the area changes as the piston 16 and valve plug 24 move relative to each other.

The configuration of this invention differs from conventional devices in two respects:

(1) The first variable restrictor 32, second variable restrictor 33, and third variable restrictor 34, arranged between the cavity 12, piston 16, and valve plug 24, and which move relative to each other, form a fluid path between the inlet port 13 with passage to the pressure-generating source and exhaust port 15 with passage to the exhaust valve 7; and (2) the fluid path through outlet port 14 with passage to the wheel brake is connected between the second variable restrictor 33 and the third variable restrictor 34.

D. Exhaust Valve

Exhaust valve 7, shown in FIG. 2, is a solenoid valve type, mounted so as to be undetachable to the opening of the cavity 12 in housing 11 through the use of a retaining ring 36 set on the outer side of flange 35 of the valve body 29. Valve seat 38 is formed on the lower portion of the passage 37. The exhaust valve 7 is equipped with an armature assembly comprised by assembling a dome-shaped sleeve 39, a magnet core 40, springs 41, the armature 43 as an integral unit with the valve plug 42, and a coil 44 inserted around the exterior of sleeve 39.

When the coil 44 is unenergized, the restoring forces of springs 41 push the valve plug 42 into the valve seat 38, thereby blocking passage between the pressure reduction chamber 23 and exhaust line 5. If the coil 44 is energized, an electromagnetic force act on the armature 43, wherein the valve plug 42 separates from the valve seat 38 to restore passage between the pressure reduction chamber 23 and exhaust line 5.

The spring forces of springs 41 are set to be larger than the hydraulic pressure acting in the direction to open the valve plug 42 when the exhaust valve 7 is in the unmagnetized state.

As shown in the diagram, the exhaust valve is also composed of a seal 10 mounted on the valve body 29, a passage 45 bored through the valve body, and a yoke ring 46, a component forming part of the electromagnetic circuit and which closes the lower opening of the valve body 29.

E. Operation During No-control (Normal Braking)

FIG. 2 illustrates the state of the brake pressure control device when the driver presses the brake pedal and no skidding of the wheels is detected. In this case, the exhaust valve 7 is unenergized, hence the valve mechanism is closed, and the pump is inactivated as well. The piston 16, receiving the spring forces of the return springs 30, is pushed towards the closed end of cavity 12, wherein the cross section area of the fluid passage of the first variable restrictor 32 is maintained at its largest value. As well, since valve plug 24 is pushed downwards by springs 28, then the cross section area of the fluid passage of the second variable restrictor 33 is also maintained at its largest value, while that of the third variable restrictor 34 is constricted. Accordingly, the brake fluid generated at the master cylinder is supplied to the wheel cylinder via a large fluid path composed of main brake line I, inlet port 13, first fluid passage 19, inlet chamber 21, outlet chamber 22, second fluid passage 20, and outlet port 14.

F. Operation During Control (Pressure Reduction)

Figure 4:
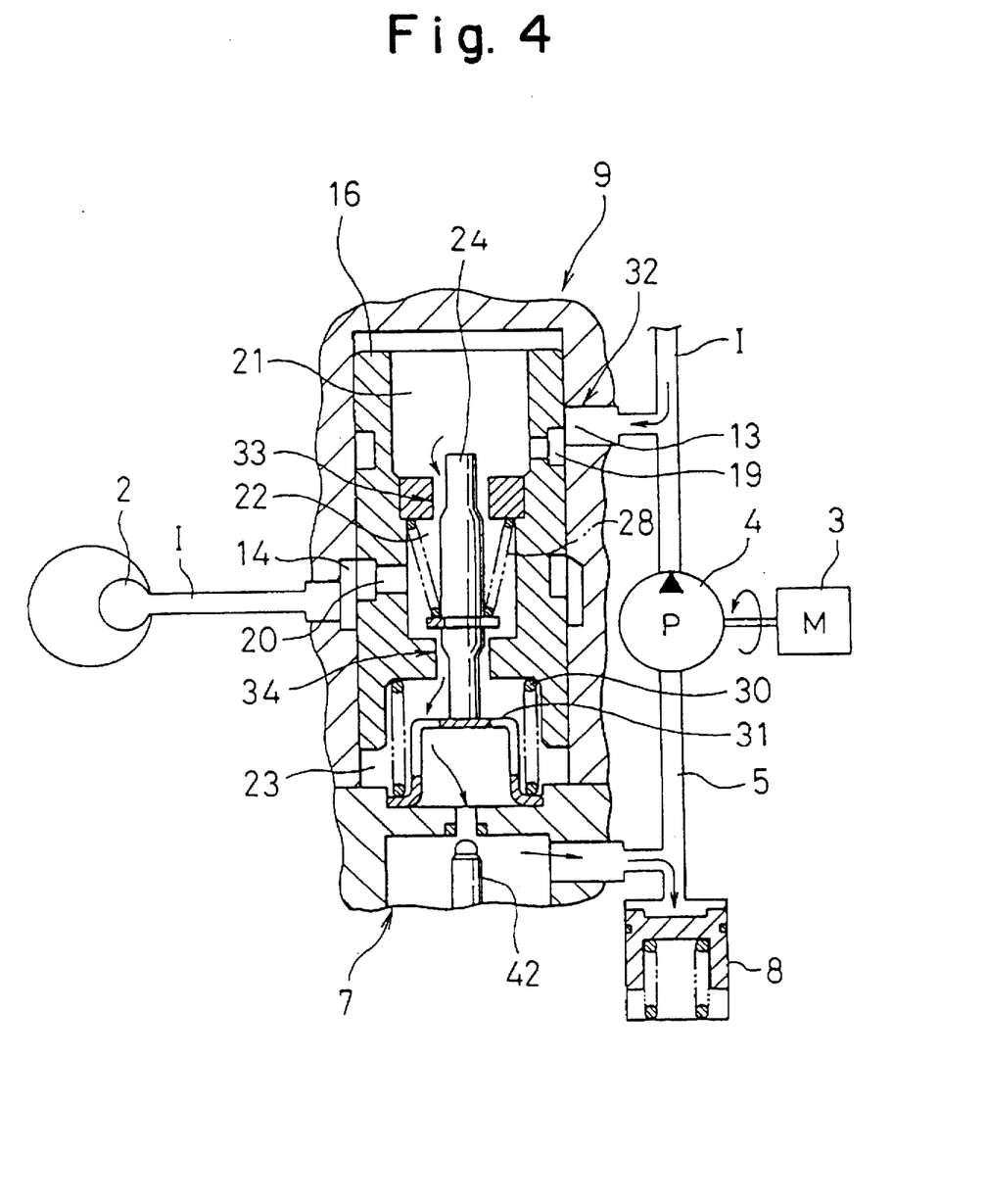
FIG. 4 is a conceptual diagram of a portion of the brake pressure control device, illustrating its action immediately after the start of ABS control.
Figure 5:
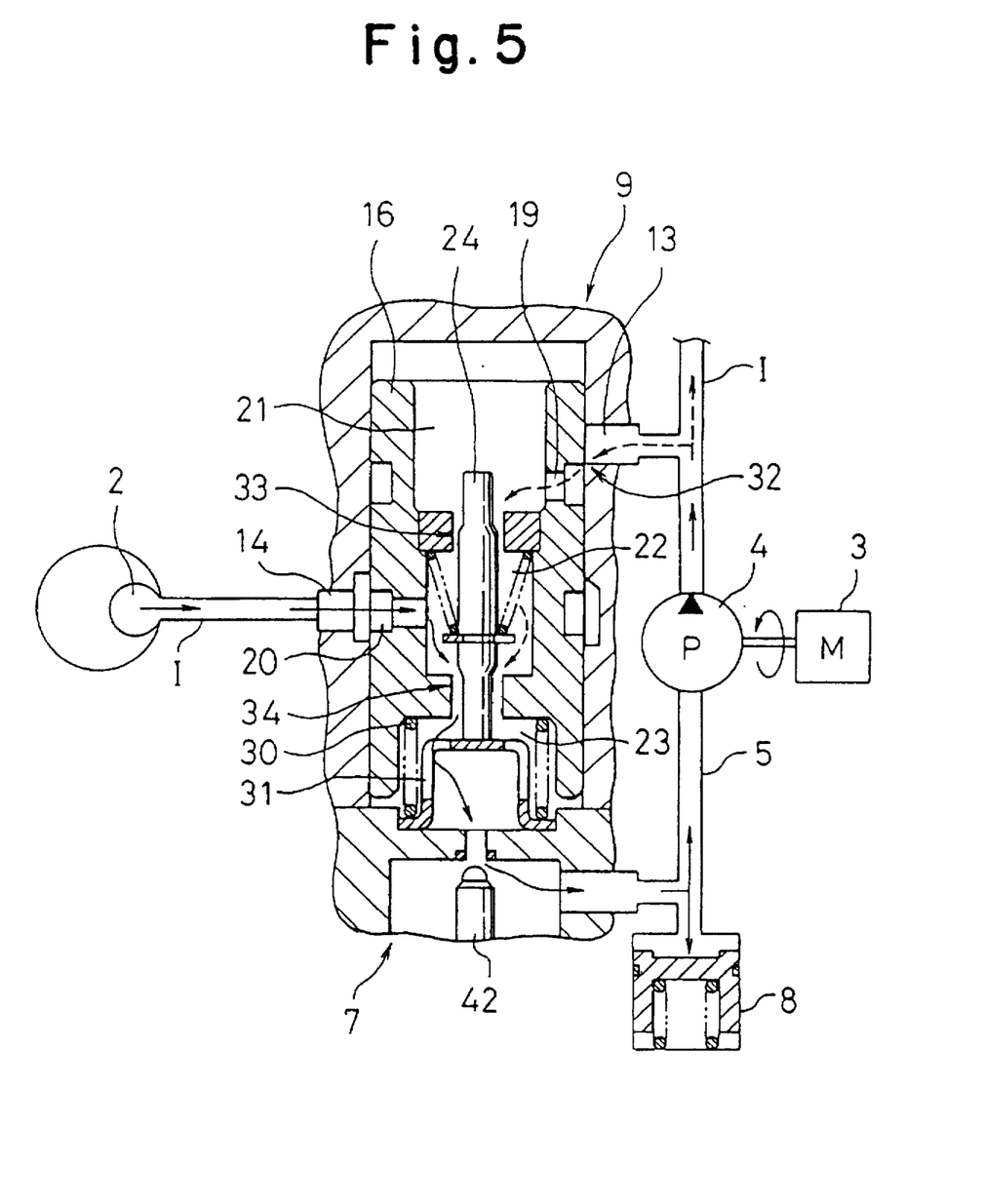
FIG. 5 is a conceptual diagram of a portion of the brake pressure control device, illustrating the operational movement when brake pressure is reduced.

FIG. 4 and 5 are conceptual diagrams illustrating the action when an impending skid of a wheel is detected, wherein ABS action starts, and brake pressure is reduced. First, exhaust valve 7 is energized and switches from the closed to the open state, thereby opening passage through the pressure reduction chamber 23 and exhaust line 5. At the same time, the motor 3 drives pump 4.

Constriction of the third variable restrictor 34, which forms a small fluid passage, causes the piston 16 to move towards the pressure reduction chamber 23 (drops downward in the diagram), while compressing the return springs 30. Meanwhile, the valve plug 24 receives the spring forces of springs 28, and moves in tandem with the piston 16. Ultimately, valve plug 24 comes to a halt as it abuts sleeve 31, while piston 16 continues to move.

As shown in FIG. 4, when only the piston 16 is moving, the second variable restrictor 33 switches from the constricted to the non-restricted state. As a result, brake fluid in the wheel cylinder 2 is exhausted to the exhaust line 5 via the main brake line I, outlet port 14, the second fluid passage 20, outlet chamber 22, third variable restrictor 34, pressure reduction chamber 23, and passages 37, 45. This reduces the pressure of the wheel cylinder 2. Fluid exhausted to the exhaust line 5 is temporarily stored in the auxiliary reservoir 8, or is cycled back to the main brake line I through the pump 4.

Meanwhile, the piston 16, temporarily blocks passage between the inlet port 13, and first fluid passage 19, which forms the first variable restrictor 32, wherein brake fluid flows from the master cylinder side at a fixed flow into the outlet chamber 22 via the inlet chamber 21. The fluid is then exhausted to the exhaust line 5 via the exhaust valve 7, which is in the open state as described previously, and shown in FIG. 5.

G. Operation During Pressure Increase

Figure 6:
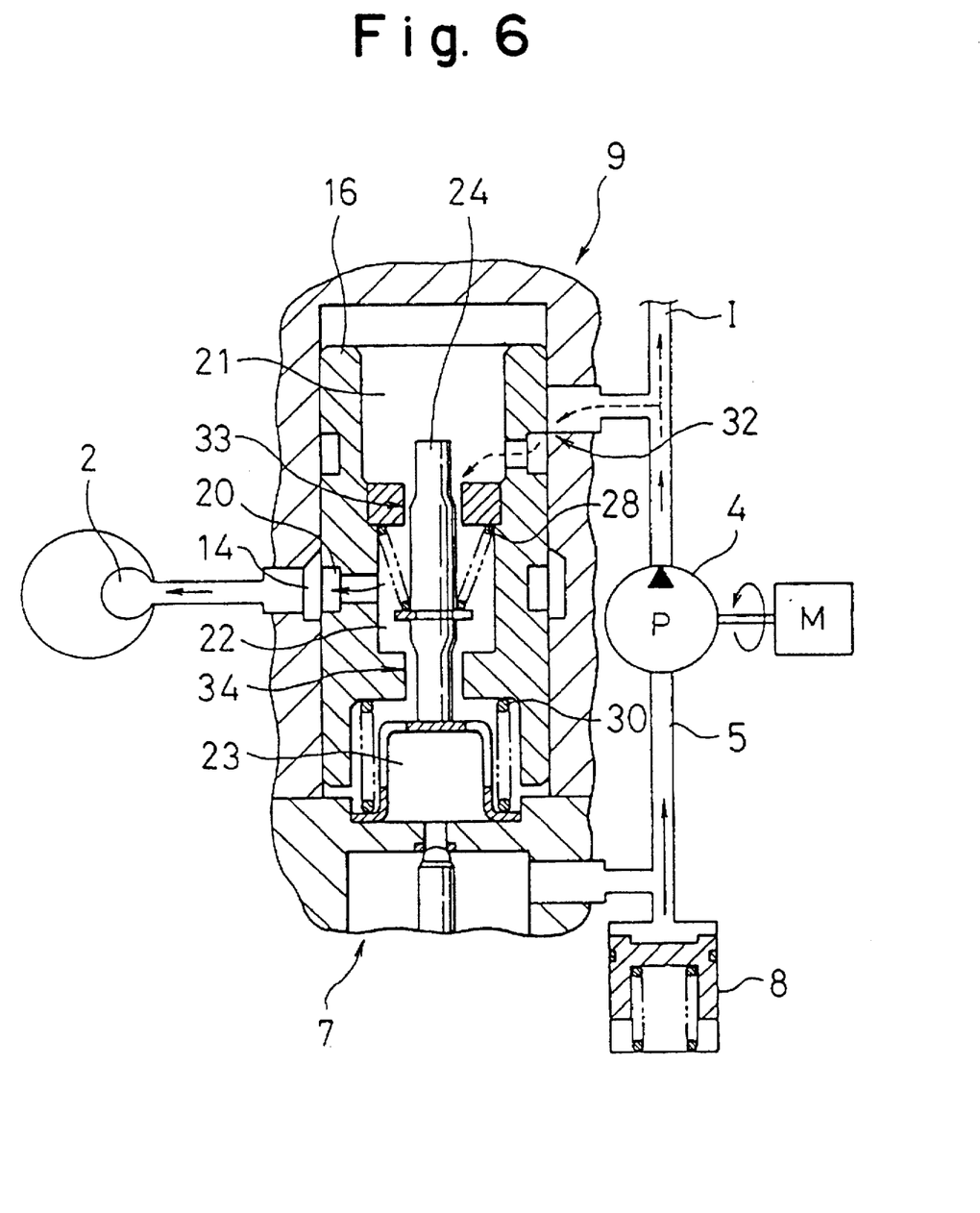
FIG. 6 is a conceptual diagram of portion of the brake pressure control device, illustrating the operational movement when brake pressure is increased.

As ABS action switches to a pressure increase mode, as shown in FIG. 6, exhaust valve 7 closes to block passage of fluid between the pressure reduction chamber 23 and the exhaust line 5, thereby stopping the pressure reduction chamber 23 and the exhaust line 5, thereby stopping the pressure decrease of the wheel cylinder 2. Although, the valve 7 closes, first variable restrictor 32 and second variable restrictor 33 remain constricted, wherein fluid cycled from the pump 4 to the main brake line I is adjusted to a prescribed flow as it passes through the variable restrictors. The fluid is then supplied to the wheel cylinder 2, wherein the brake pressure rises very slightly.

H. Flow Control Action of the Variable Restrictors

Next, the flow control action by each variable restrictor is explained.

When the piston 16, drops and blocks passage between the inlet port 13 and first fluid passage 19, the flow of brake fluid stops, wherein the equilibrium state of the forces acting upward and downward on the piston 16 can be derived from Equation 1 as follows:

$$P_1 \cdot A = (P_2 \cdot A) + F_1 + F_2 \quad (1)$$

where

A=Pressure-subjected area of piston 16
$F_1$=Load of return springs 30
$F_2$=Load of springs 28
$P_1$=Pressure of inlet chamber 21
$P_2$=Pressure of outlet chamber 22 (wheel cylinder 2, pressure reduction chamber 23).

From Equation 1, the pressure difference $\Delta P$, a prescribed value, between $P_1$ and $P_2$ is described in Equation 2.

$$\Delta P = \frac{(F_1 + F_2)}{A} \quad (2)$$

That is, the first variable restrictor 32 closes when the pressure of inlet chamber 21 becomes higher than the pressure of outlet chamber 22 by a prescribed value, $\Delta P$.

When the first variable restrictor 32 closes and the flow of brake fluid from the inlet port 13 to the inlet chamber 21 stops, there is still passage between the inlet chamber 21 and the outlet chamber 22 via the variable second restrictor 33. Therefore the pressure difference between the inlet chamber and the outlet chamber becomes smaller than the prescribed value described previously; that is ($P_1-P_2<\Delta P$). Accordingly, the upward and downward force acting on piston 16 at this time is expressed by Equation 3.

$$P_1 \cdot A < (P_1 \cdot A) + F_1 + F_2 \quad (3)$$

That is, when the first variable restrictor 32 closes, the force pushing the piston 16 upwards (i.e.) the right side of Equation 3) becomes greater than the force pushing the piston 16 downwards (i.e. the left side of Equation 3), wherein the piston moves up, the first variable restrictor 32 opens, and brake fluid flows from the inlet port 13 into the inlet chamber 21. At this point, the constriction of the second variable restrictor 33 increases the pressure difference between the inlet chamber 21 and the outlet chamber 22, causing the piston 16 to move downwards. Subsequently, the first variable restrictor 32 closes when the pressure difference (P1–P2) of the inlet chamber and the outlet chamber reaches the prescribed value at $\Delta P$.

The piston 16 repeatedly moves back and forth in this manner to open and close the first variable restrictor 32, wherein brake fluid is supplied form the inlet port 13 to the wheel brake at a prescribed flow.

When the difference between the pressure of the inlet port 13 (master cylinder 1) and the pressure of the outlet chamber 22 (wheel cylinder 2) becomes less than the prescribed value $\Delta P$, the piston 16 moves upward with the spring force of return spring 30 and springs 28, and the valve returns to the non-control state of FIG. 1.

I. Example 2

Figure 7:
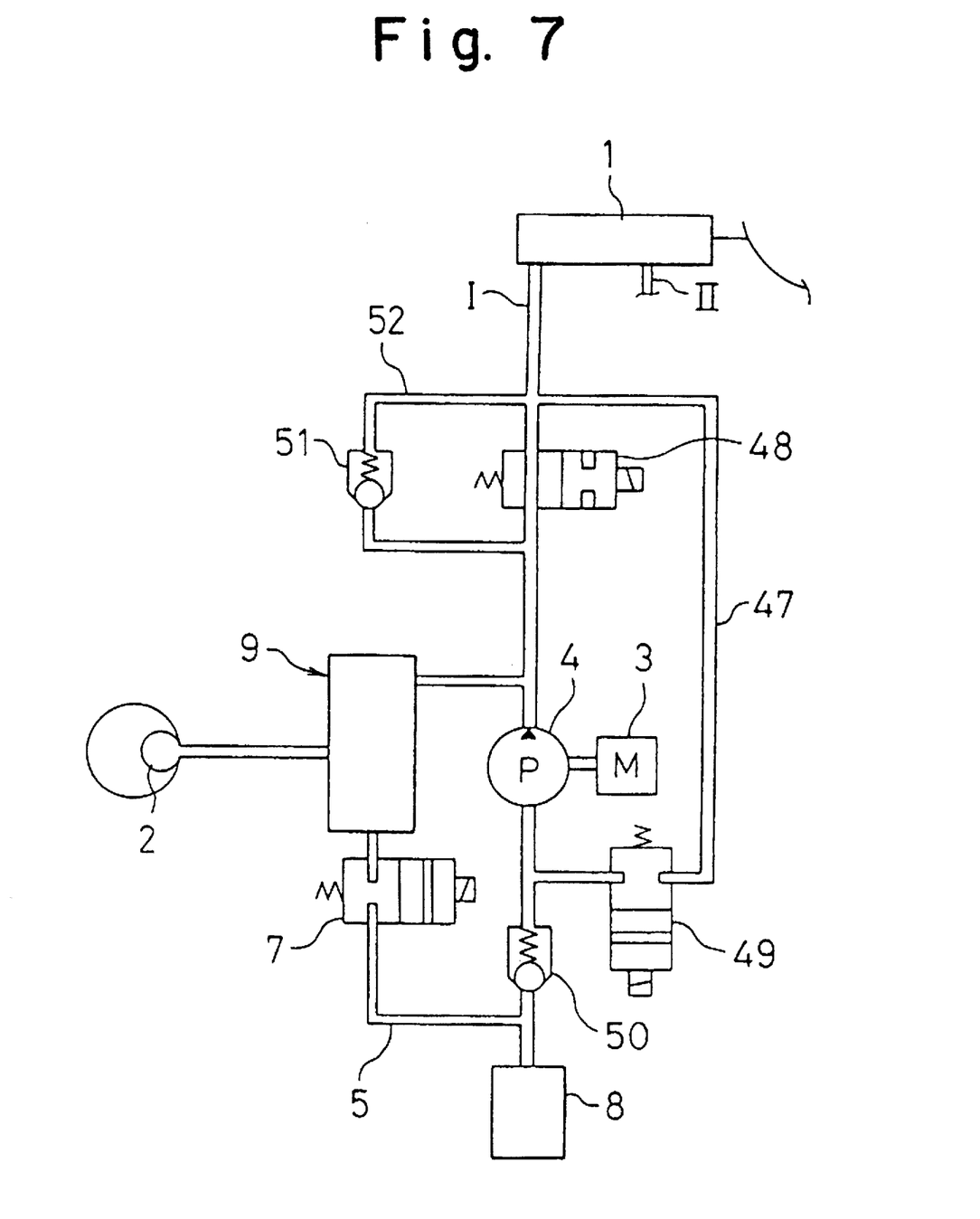
FIG. 7 illustrates a braking system configured with the brake pressure control device equipped with both an ABS and TCS function as embodied in Example 2.

FIG. 7 illustrates another embodiment of the brake pressure control device equipped with a dual ABS and TCS function.

The basic structural elements and action of this embodiment are the same as that of Example 1 described previously. Accordingly, the structural elements have been designated with the same symbols as for the Example 1 and an explanation is omitted here.

This embodiment differs from that of Example 1 as follows:

(1) A suction line 47 has been added connecting the main brake line I to the exhaust line 5 on the suction side of pump 4;

(2) A first normally-open solenoid valve 48, for traction control, is set downstream of the point of confluence of the main brake line I and the suction line 47;

(3) A normally-closed second solenoid valve 49, for traction control, is set in suction line 47;

(4) A one-way valve 50 that allows brake fluid to flow only towards the hydraulic pump 4 is set upstream of the point of confluence of exhaust line 5 and the suction line 47; and (5) A by-pass line 52, installed with a relief valve 51, is connected from either side of the first solenoid valve 48 to the main brake line I.

The action of the brake pressure control device as embodied in Example 2 is explained as follows.

As shown in FIG. 7, during no control, none of the control elements are energized. That is, the elements added in this embodiment are in the following state: the first solenoid valve 48 is open, and the second solenoid valve 49 is closed.

The action of the device during normal braking when there is no control function is the same as for the embodiment of Example 1, and an explanation here is omitted.

During ABS control, the first solenoid valve 48 is open, and the second solenoid valve 49 is closed. Otherwise, all other actions are the same as for the embodiment of Example 1; hence an explanation is omitted here.

During TCS control, the first solenoid valve 48 switches closed and simultaneously the second solenoid valve 49 switches open, and pump 4 is operating. The pump 4 draws in brake fluid through the suction line 47, transmits the brake fluid through the flow control valve 9, which is in the non-operating state, to the wheel cylinder 2. This action controls the drive wheels from excessive spinning. As this control starts, the exhaust valve 7 opens to reduce the brake pressure. At this point, the flow control valve 9 starts to regulate the pressure by the same action as described previously for Example 1.

Subsequently, the repeated opening and closing of the exhaust valve 7 increases or decreases the brake pressure of the drive wheels, thereby controlling the drive wheels from excessive spinning.

During the TCS control, the first solenoid valve 48 remains closed to prevent brake fluid discharged from the pump 4 for flowing to the master cylinder 1. Excess fluid discharged thereof is exhausted to the master cylinder 1 side via the relief valve 51.

J. Example 3

Figure 8:
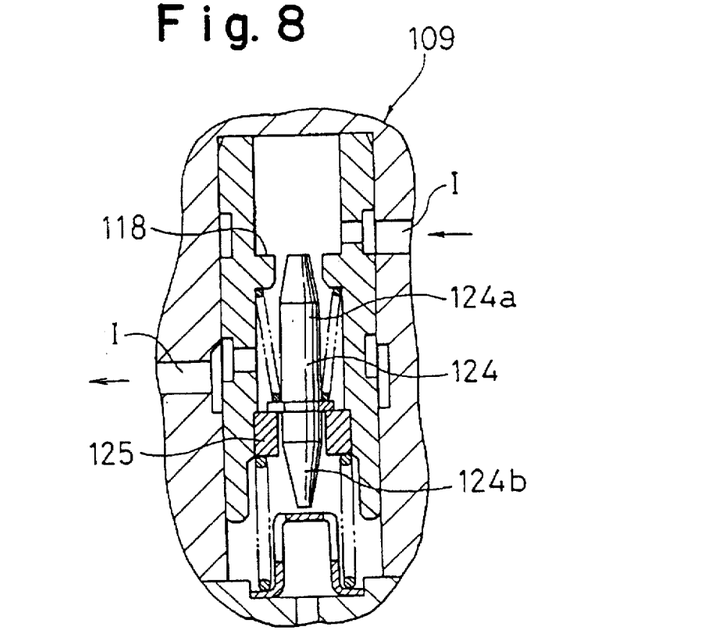
FIG. 8 is a partial cross section diagram of the exhaust valve and flow control valve assembled into one integrated unit, and explains the brake pressure control device as embodied in Example 3, in which the valve plug of the flow control valve is needled-shaped.

FIG. 8 illustrates another embodiment of the brake pressure control device, in which at least one of the ends 124a or 124b of valve plug 124 comprising the flow control valve 109 is needle-shaped.

In addition, the bushing 125, the ring-shaped projection, and the tubular projection 118 can be of reverse position from that of Example 1.

K. Example 4

Figure 9:
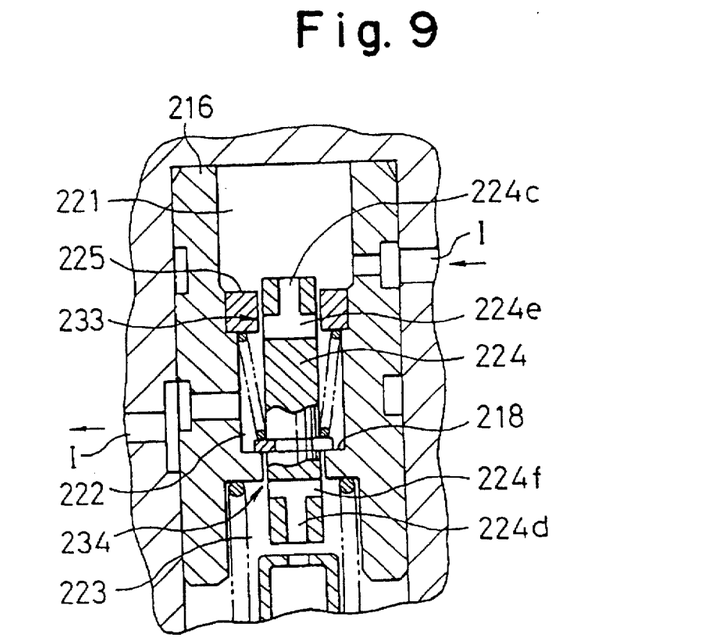
FIG. 9 is a partial cross section diagram of the exhaust valve and flow control valve assembled into one integrated unit, and explains the brake pressure control device as embodied in Example 4, in which fluid channels are formed inside the valve plug.

FIG. 9 illustrates another embodiment of the brake pressure control device in which fluid channels are formed inside the valve plug 224. Axial channels 224c, 224d and radial passages 224e, 224f, formed in the radial direction with passage to the axial channel 224c and 224d respectively are bored inside the upper and lower part respectively of the cylindrical valve plug 224. Axial channel 224c and radial passage 224e form a fluid path for passage between the inlet chamber 221 and outlet chamber 222; and axial channel 224d and radial passage 224 form a fluid channel for passage between the outlet chamber 222 and pressure reduction chamber 223.

In addition, a second variable restrictor 233 is formed between the axial channel 224c and the ring bushing 225; and the second variable restrictor 233 or third variable restrictor 234 is formed between the radial passage 224f and the tubular projection 218.

L. Example 5

Figure 10:
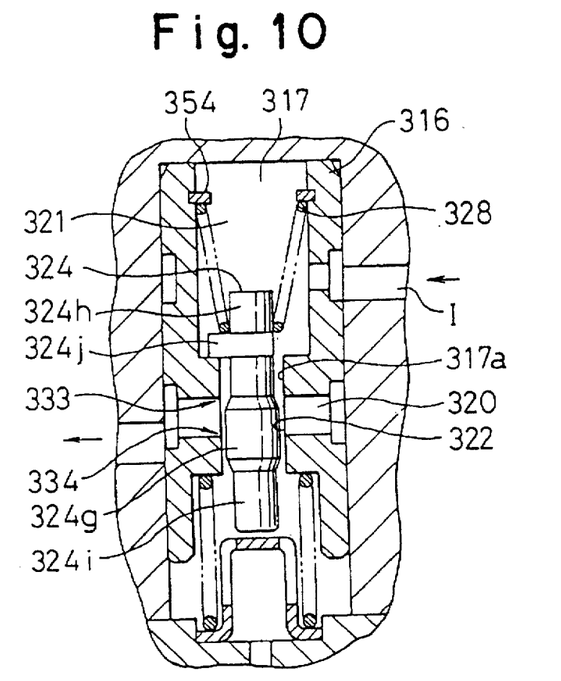
FIG. 10 is a partial cross section diagram of the exhaust valve and flow control valve assembled into one integrated unit, and explains the brake pressure control device as embodied in Example 5, in which the valve component on the piston side comprising a second variable restrictor and a third variable restrictor is formed directly in the piston.

FIG. 10 illustrates another embodiment of the brake pressure control device, in which the valve components on the piston side comprising the second and third variable restrictors 333, 334 are formed directly in piston 316.

The through-hole 317 is formed such that a small-diameter cavity 317a of uniform diameter is formed in a center region, and a second fluid passage 320 intersects the small-diameter cavity 317a. Meanwhile, the valve plug 324 is formed in the virtual center and is composed of a larger-diameter component 324g and small-diameter components 324h, 324i formed on either side thereof so as to form a large fluid path between the small-diameter component 324h and the small-diameter cavity 317a.

A stopper 324j is set around and projects from a portion of the small-diameter component 324h located on the inlet chamber 321 side. Springs 328 are positioned between the upper face of the stopper 324j and the retaining rings 328, the valve plug 324 is positioned such that the lower face of the stopper 324j abuts the bottom face of the inlet chamber 321 of piston 316.

In FIG. 10, numeral 322 is the outlet port, and 354 is the retaining ring which is positioned to fix the spring 328 upon the piston 316.

In this embodiment, the valve components on the piston 16 side comprising the second and third variable restrictors 333 and 334 that can be formed directly to the piston 316. Hence the bushing 25 (see FIG. 2) of Example 1 can be omitted, thereby reducing the number of structural components.

M. Example 6

Figure 11:
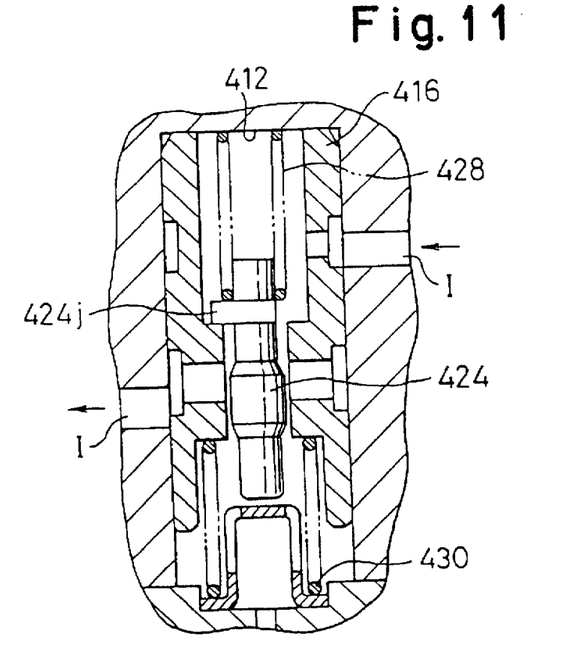
FIG. 11 is a partial cross section diagram of the exhaust valve and flow control valve assembled into one integrated unit, and explains the brake pressure control device as embodied in Example 6, in which springs are installed between the cavity and valve plug.

FIG. 11 illustrates another embodiment of the brake pressure control device in which springs 428 are set between the bottom of the cavity 412 and the valve plug 424 (stopper 424j). In this case, the retaining rings 354, as described in example 5, are not required because the spring 428 is positioned upon the piston 416 so as not to be given a counteractive force from the piston. Moreover, as the fluid flow is adjusted, only the spring forces of the return springs 430 act on the valve plug 424. This facilitates the specification of a constant pressure difference for flow control, making the adjustment more accurate.

N. Example 7

In the previous examples, the piston is housed directly in the cavity of the housing. A shown in FIG. 12, a guide tube 555 can be inserted between the piston 516 and the cavity 512. The purpose of the guide tube 555 is to enable the cavity 512 to be manufactured to coarser specifications.

Figure 12:
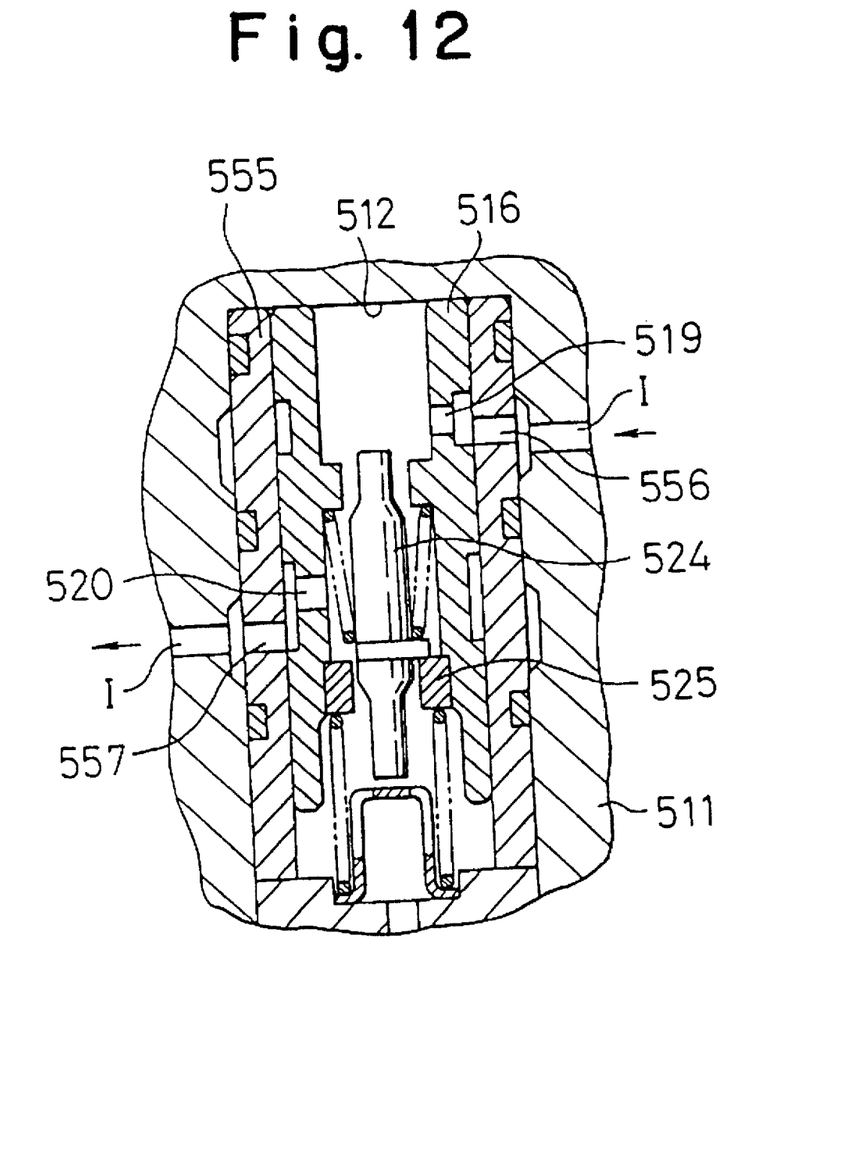
FIG. 12 is an explanatory diagram of a conventional brake pressure control device as embodied in Example 7, in which a guide tube is inserted between the piston and the cavity.

Fluid channels 556, 557, corresponding to the inlet port and outlet port of the previous examples, are bored in the guide tube 555 in positions corresponding to the first and second fluid passages 519, 520. Also, a first variable restrictor 532 is formed between the fluid passages 519 and fluid channels 556. The valve plug 524 is positioned inside the piston 516, abutting the bushing 524.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A brake pressure control device comprising:

an exhaust line branching off at a branching point from a main brake line connecting a pressure generating source to a wheel brake;

a flow control valve capable of increasing or decreasing a wheel brake pressure by a controlled ratio installed at the branching point; and an exhaust valve capable of reducing the wheel brake pressure installed between the flow control valve and the exhaust line;

wherein the flow control valve comprises a hydraulically-actuated valve equipped with inner and outer movable components housed inside a cavity, an inlet port with passage to the main brake line on a pressure-generating source side, an outlet port with passage to the main brake line on a wheel brake side, and an exhaust port with passage to the exhaust valve are formed in the cavity, wherein the inner and outer movable components are disposed to form a plurality of passages with passage to an inlet port, outlet port, and exhaust port, wherein a first variable restrictor is disposed between the inlet port and the outer movable component, a second variable restrictor and a third variable restrictor are disposed between the inner and outer movable components, said second and third variable restrictors being continually open and switchable between constricted and non-constricted states, and wherein one of the plurality of passages is a passage with passage to the outlet port that is connected between the second variable restrictor and the third variable restrictor.

2. A brake pressure control device as claimed in claim 1, wherein in a normal braking state, the first variable restrictor and the second variable restrictor are disposed in a non-constricted state, and the third variable restrictor is disposed in a constricted state, and in a control action state, the second variable restrictor is disposed so as to be capable of switching to a constricted state through a relative movement of the inner and outer movable components, after which the third variable restrictor is disposed so as to be capable of switching to a non-constricted state, and wherein a cross-sectional area of an opening of the first variable restrictor is controlled by a pressure differential on either side of the second variable restrictor.

3. A brake pressure control device as claimed in claim 1 or claim 2, wherein the outer movable member of the flow control valve is a piston with a through-hole in an axial direction and housed to slide within the cavity, and the inner movable member of the flow control valve is a valve plug housed to be movable in the axial direction within the through-hole, wherein the piston has a first fluid passage disposed so as to enable passage between the inlet port and the through-hole, wherein a second fluid passage is disposed so as to enable passage between the outlet port and the through-hole, wherein the first variable restrictor is disposed between the inlet port and the first fluid passage such that a cross-sectional area of a fluid path changes with movement of the piston, wherein a second variable restrictor formed between the first fluid passage and the second fluid passage such that a cross-sectional area of the fluid path changes with a relative movement of the piston and valve plug, wherein a third variable restrictor is disposed on an exhaust port side of the second fluid passage such that a cross-sectional area of a fluid path changes with a relative movement of the piston and valve plug, wherein an inlet chamber with passage to the first fluid passage, an outlet chamber with passage to the second fluid passage, and a pressure reduction chamber with passage to the exhaust valve are disposed on either side of the second variable restrictor and the third variable restrictor, and wherein return springs are disposed within a pressure reduction chamber to force the piston towards the inlet chamber.

4. A brake pressure control device as claimed in claim 3, further comprising a projection disposed around the valve plug to limit movement of a direction of the pressure reduction chamber to a prescribed distance relative the piston, and wherein springs are disposed in a compressed state between the valve plug and piston to force the valve plug towards the pressure reduction chamber.

5. A brake pressure control device as claimed in claim 3, further comprising a projection disposed around the valve plug to limit movement of the direction of a pressure reduction chamber to a prescribed distance relative to the piston, and wherein springs are disposed in a compressed state between the valve plug and cavity within an inlet chamber to force the valve plug towards the pressure reduction chamber.

6. A brake pressure control device as claimed in claim 4, further comprising ring-shaped projections through which an upper and a lower portion of the valve plug travel, and are disposed inside the through-hole of the piston, wherein the second variable restrictor and the third variable restrictor are formed between the ring projections and the valve plug.

7. A brake pressure control device as claimed in claim 6, in which at least one of the ring projections is a bushing affixed to the piston.

8. A brake pressure control device as claimed in claim 6, wherein at least one of either the upper or lower portion of the valve plug that passes through a ring projection comprises a notch so as to form fluid channels between a portion of the outer perimeter of the valve plug and a ring-shaped projection.

9. A brake pressure control device as claimed in claim 6, wherein at least one of the upper or lower portion of the valve plug that passes through the ring projections is needle-shaped.

10. A brake pressure control device as claimed in claim 6, further comprising an axial channel and a radial passage connected to said axial channel, disposed inside at least one of the upper or lower portion of the valve plug that passes through the ring projections of the piston, and wherein at least one of the second variable restrictor or the third variable restrictor is disposed between the radial passage and a ring-shaped projection.

11. A brake pressure control device as claimed in claim 7, in which the springs that force the valve plug towards the pressure reduction chamber are disposed within the outlet chamber.

12. A brake pressure control device as claimed in claim 4 in which the through-hole of the piston is of a variable diameter to define a small-diameter cavity therein, and a second fluid passage is disposed in the radial direction with passage to the small-diameter cavity;

wherein the second variable restrictor and the third variable restrictor are formed between the second fluid passage and the valve plug.

13. A brake pressure control device as claimed in claim 1, further comprising housing disposed so as to directly house the outer movable member wherein the housing is composed of one or more cavities.

14. A brake pressure control device as claimed in claim 1, further comprising a housing disposed so as to house the flow control valve and exhaust valve in series wherein the housing is composed of one or more cavities.

15. A brake pressure control device as claimed in claim 1, further comprising housing that is made from an aluminum-based material.

16. A brake pressure control device as claimed in claim 1, further comprising a vehicle equipped with a anti-lock brake system.

17. A brake pressure control device as claimed in claim 1, further comprising a vehicle equipped with both an anti-lock brake system and a traction control system.

* * * * *